US010394841B2

(12) United States Patent
Denman et al.

(10) Patent No.: US 10,394,841 B2
(45) Date of Patent: Aug. 27, 2019

(54) GENERATING CONTEXTUAL SEARCH PRESENTATIONS

(71) Applicant: Google LLC, Mountain View, CA (US)

(72) Inventors: Donn L. Denman, Los Gatos, CA (US); Pedro S. Garcia, Mountain View, CA (US); David Black, Mountain View, CA (US); Samarth Keshava, San Francisco, CA (US); Daniel E. Fish, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 15/454,117

(22) Filed: Mar. 9, 2017

(65) Prior Publication Data

US 2017/0242900 A1 Aug. 24, 2017

Related U.S. Application Data

(63) Continuation of application No. 14/308,565, filed on Jun. 18, 2014, now Pat. No. 9,613,145.

(51) Int. Cl.
*G06F 17/30* (2006.01)
*G06F 16/248* (2019.01)
(Continued)

(52) U.S. Cl.
CPC ........ *G06F 16/248* (2019.01); *G06F 16/2457* (2019.01); *G06F 16/284* (2019.01);
(Continued)

(58) Field of Classification Search
CPC .. G06F 16/951; G06F 16/9535; G06F 16/248; G06F 16/332; G06F 16/3322;
(Continued)

(56) References Cited

U.S. PATENT DOCUMENTS 6,567,801 B1 5/2003 Chiang et al.
8,306,806 B2 11/2012 Shi
(Continued)

FOREIGN PATENT DOCUMENTS

CN 102314456 A 1/2012
CN 102576368 A 7/2012
(Continued)

OTHER PUBLICATIONS

"Kindle iPhone/iPad App Now Smarter with a Dictionary, Wikipedia, and Google," [online] [Retrieved on Jun. 18, 2014]; Retrieved from the Internet URL: http://techcrunch.com/2010/07/29/kindle-iphoneipad-app-now-smarter-with-a-dictionary-wikipedia-and-google/; 3 pages.
(Continued)

*Primary Examiner* — Dangelino N Gortayo
(74) *Attorney, Agent, or Firm* — Fish & Richardson P.C.

(57) ABSTRACT

Methods, systems, and apparatus, including computer programs encoded on computer storage media, for generating contextual search presentations. One of the methods includes obtaining selection data identifying a term selected by a user from a document displayed to the user; determining whether or not the context data and the selection data satisfy one or more criteria for presenting any of one or more types of special case contextual search presentations; in response to determining that the context data and the selection satisfy criteria for presenting a first type of special case contextual search presentation, generating a first special case contextual search presentation of the first type; in response to determining that the context data and the selection data do not satisfy the criteria, generating a default contextual search presentation; and providing the first special case contextual search presentation or the default contextual search presentation for presentation to the user.

20 Claims, 7 Drawing Sheets

(51) Int. Cl.
*G06F 16/28* (2019.01)
*G06F 16/951* (2019.01)
*G06F 16/2457* (2019.01)
*G06F 16/9038* (2019.01)
*G06F 16/9535* (2019.01)
G06F 16/958 (2019.01)
G06F 16/33 (2019.01)
G06F 16/338 (2019.01)
G06F 16/332 (2019.01)

(52) U.S. Cl.
CPC ........ *G06F 16/9038* (2019.01); *G06F 16/951* (2019.01); *G06F 16/9535* (2019.01); *G06F 16/332* (2019.01); *G06F 16/338* (2019.01); *G06F 16/3344* (2019.01); *G06F 16/958* (2019.01)

(58) Field of Classification Search
CPC ............. G06F 16/3325; G06F 16/3328; G06F 16/3344; G06F 16/338; G06F 16/367
USPC .......................... 707/706, 748, 694, 752, 769
See application file for complete search history.

(56) References Cited

U.S. PATENT DOCUMENTS

| | | | |
|---|---|---|---|
| 8,332,400 B2 | 12/2012 | Cooke | |
| 8,594,996 B2 | 11/2013 | Liang et al. | |
| 8,601,387 B2 | 12/2013 | Read | |
| 8,631,009 B2 | 1/2014 | Lisa | |
| 8,688,726 B2 | 4/2014 | Mahajan | |
| 8,909,639 B2 | 12/2014 | Hubbard | |
| 9,043,709 B2* | 5/2015 | Chae | G06F 3/04883 715/763 |
| 9,262,766 B2 | 2/2016 | Mason | |
| 2005/0221856 A1 | 10/2005 | Hirano et al. | |
| 2005/0275716 A1 | 12/2005 | Shingu et al. | |
| 2006/0085515 A1 | 4/2006 | Kurtz et al. | |
| 2008/0235594 A1* | 9/2008 | Bhumkar | G06F 16/9038 715/738 |
| 2009/0055356 A1* | 2/2009 | Hanyu | G06F 16/332 |
| 2009/0119283 A1 | 5/2009 | Muehlbauer | |
| 2009/0199077 A1 | 8/2009 | Sar et al. | |
| 2010/0228710 A1* | 9/2010 | Imig | G06F 16/9535 707/706 |
| 2011/0015996 A1 | 1/2011 | Kassoway | |
| 2011/0070872 A1 | 3/2011 | Ellanti et al. | |
| 2011/0219291 A1 | 9/2011 | Lisa | |
| 2011/0231392 A1 | 9/2011 | Boswell | |
| 2013/0031076 A1* | 1/2013 | Bhola | G06F 16/3332 707/706 |
| 2013/0110825 A1 | 5/2013 | Henry | |
| 2013/0110860 A1 | 5/2013 | Taranov et al. | |
| 2013/0226935 A1 | 8/2013 | Bai | |
| 2014/0180672 A1* | 6/2014 | Mo | G06F 16/3344 704/9 |
| 2015/0363485 A1* | 12/2015 | Bennett | G06F 16/3325 707/694 |

FOREIGN PATENT DOCUMENTS

| | | |
|---|---|---|
| CN | 102929926 A | 2/2013 |
| CN | 103379201 A | 10/2013 |
| CN | 103631887 A | 3/2014 |
| CN | 103761090 A | 4/2014 |
| JP | 2003-178067 | 6/2003 |
| JP | 2005-352933 | 12/2005 |
| JP | 2007-18166 | 1/2007 |
| JP | 2008-508605 | 3/2008 |
| JP | 2010-519609 | 6/2010 |
| RU | 2476927 | 2/2013 |
| WO | WO 2008100690 | 8/2008 |
| WO | WO2011026145 | 3/2011 |

OTHER PUBLICATIONS

"Google: Research Tool—Docs Editors Help," [online] [Retrieved on Jun. 18, 2014]; Retrieved from the Internet URL: https://support.google.com/drive/answer/2481802; 2 pages.
"Turning the Page with a New Google Play Books App for Android," [online] [Retrieved on Jun. 18, 2014]; Retrieved from the Internet URL: http://officialandroid.blogspot.ca/2012/09/turning-page-with-new-google-play-books.html; 2 pages.
"Apture Packs a Lot of Media into a Little Pop-up," [online]; [Retrieved on Jun. 18, 2014]; Retrieved from the Internet URL: http://readwrite.com/2009/02/15/apture_popups_media#awesm=~oHzAqPziOvyUho; 8 pages.
International Search Report and Written Opinion in International Application No. PCT/US2015/036295, dated Sep. 11, 2015, 11 pages.
International Preliminary Report of Patentability in International Application No. PCT/US2015/036295, dated Dec. 29, 2016, 9 pages.
Office Action issued in Japanese Application No. 2016-574153, dated Jan. 5, 2018, 13 pages (with English Translation).
Office Action issued in Russian Application No. 2017101415/08 (002329) dated Mar. 15, 2018, 14 pages (with English Translation).
CN Office Action issued in Chinese Application No. 2015800227777.0, dated Jan. 25, 2019, 30 pages (with English translation).

* cited by examiner

GENERATING CONTEXTUAL SEARCH PRESENTATIONS

CROSS-REFERENCE TO RELATED APPLICATION

This application is a continuation of U.S. application Ser. No. 14/308,565, filed Jun. 18, 2014, the contents of which are incorporated by reference herein.

BACKGROUND

This specification relates to Internet search engines.

Internet search engines aim to identify resources, e.g., web pages, images, text documents, and multimedia content, that are relevant to a user's information needs and to present information about the resources in a manner that is most useful to the user. Internet search engines generally return a set of search results, each identifying a respective resource, in response to a user-submitted query.

SUMMARY

This specification describes technologies that relate to generating contextual search presentations.

In general, one innovative aspect of the subject matter described in this specification can be embodied in methods that include the actions of obtaining selection data identifying a term selected by a user from a document displayed to the user, the term comprising one or more adjacent words, and context data comprising one or more other words in the document; determining whether or not the context data and the selection data satisfy one or more criteria for presenting any of one or more types of special case contextual search presentations, wherein each type of special case contextual search presentation includes a formatted presentation of a different type of content; in response to determining that the context data and the selection satisfy criteria for presenting a first type of special case contextual search presentation, generating a first special case contextual search presentation of the first type for the selected term; in response to determining that the context data and the selection data do not satisfy the criteria for presenting any of the types of special case contextual search presentations, generating a default contextual search presentation for the selected term; and providing the first special case contextual search presentation or the default contextual search presentation for presentation to the user. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The default contextual search presentation can be a definitional answer box, wherein the definitional answer box is a formatted presentation of a definition of the term selected by the user, and wherein generating the contextual search presentation comprises obtaining the definitional answer box from a search engine in response to a first search query that includes the selected term. Generating the default contextual search presentation can include obtaining search results from the search engine for one or more search queries derived from the selected term.

The one or more types of special case contextual search presentations can include an entity type of contextual search presentation that includes a knowledge panel, and wherein a knowledge panel is a formatted presentation of content relevant to an entity. Determining whether or not the context data and the selection data satisfy criteria for presenting the entity type of special case contextual search presentation can include: determining, by providing the context data and the selection data to an entity disambiguation system, whether or not the selected term refers to an entity in context of the other words in the document.

The actions can further include: determining that the selected term refers to an entity in context of the other words in the document; and generating an entity contextual search presentation for the selected term, comprising obtaining a knowledge panel for the entity referred to by the selected term from a search engine.

The one or more types of special case contextual search presentations can include a currency type of contextual search presentation that includes a currency answer box, wherein a currency answer box is a formatted presentation of an amount in a first currency and a corresponding amount in a second currency. Determining whether or not the context data and the selection data satisfy criteria for presenting the currency type of contextual search presentation can include: determining whether or not the context data and selection data identify any currency and any identified currency is different from a currency associated with the user.

The actions can further include: determining that the context data and the selection data identify an amount in an identified currency and that the identified currency is different from the currency associated with the user; and generating a currency contextual search presentation for the context data and the selection data, comprising obtaining, from a search engine, a currency answer box including an amount in the identified currency and a corresponding amount in the currency associated with the user.

The one or more types of special case contextual search presentations can include a translation type of contextual search presentation that includes a translation answer box, and wherein a translation answer box is a formatted presentation of a translation of a word in a first language to a word in a second language. Determining whether or not the context data and the selection data satisfy criteria for presenting the translation type of contextual search presentation can include: identifying a language in which the selected term is written and determining whether or not the language in which the selected term is written is different from a language associated with the user.

The actions can further include: determining that the language in which the selected term is written is different from the language associated with the user of the user device; and generating a translation contextual search presentation for the selected term, comprising obtaining, from a search engine, a translation answer box including a translation of the selected term into the language associated with the user.

The one or more types of special case contextual search presentations can include a time zone type of contextual search presentation that includes a time zone answer box, wherein a time zone answer box is a formatted presentation of a time in a first time zone and a corresponding time in a second time zone. Determining whether or not the context data and the selection data satisfy criteria for presenting the time zone type of contextual search presentation can include: determining whether or not the selected term identifies a time in a particular time zone and whether the particular time zone is different from a time zone associated with the user.

The actions can further include: determining that the selected term identifies a time in a particular time zone that is different from the time zone associated with the user; generating a time zone contextual search presentation for the selected term, comprising obtaining, from a search engine, a time zone answer box the time in the particular time zone and a corresponding time in the time zone associated with the user.

The subject matter described in this specification can be implemented in particular embodiments so as to realize one or more of the following advantages. A user viewing a document on a user device can easily obtain relevant information about a portion of a document, e.g., a word in the document, one or more adjacent words in the document, or another portion of the document. The relevant information is provided to the user in a manner that takes into account the context of the word in the document or the context that the user is in. Additionally, different kinds of information relevant to the portion of the document can be provided to the user depending on the context, improving the user experience. Furthermore, the relevant information can be provided to the user in a manner that allows the user to easily view the information while continuing to view the displayed document. The user can identify the portion of the document that he or she desires relevant information about through a simple gesture, e.g., a tap touch input or a long-press touch input on a touchscreen display.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
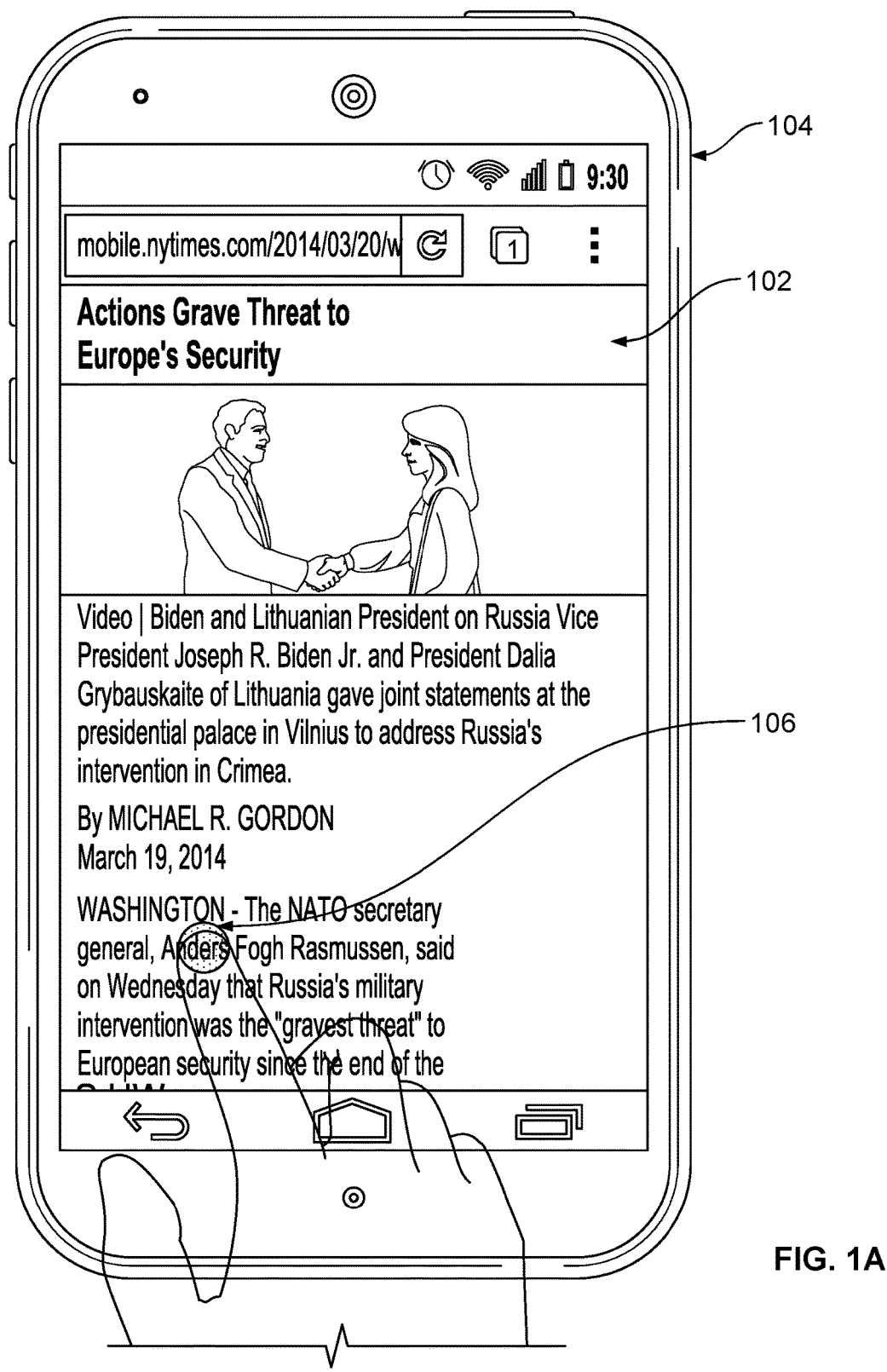
FIG. 1A shows an example document displayed on an example mobile device.

FIG. 1A shows an example document 102 displayed on an example mobile device 104. In particular, the document 102 is displayed in a web browser executing on the mobile device 104. In the example of FIG. 1A, a user of the mobile device 104 has submitted a touch input 106 on the touchscreen display of the mobile device 104 to select a word, "Anders," in the document 102.

Figure 1B:
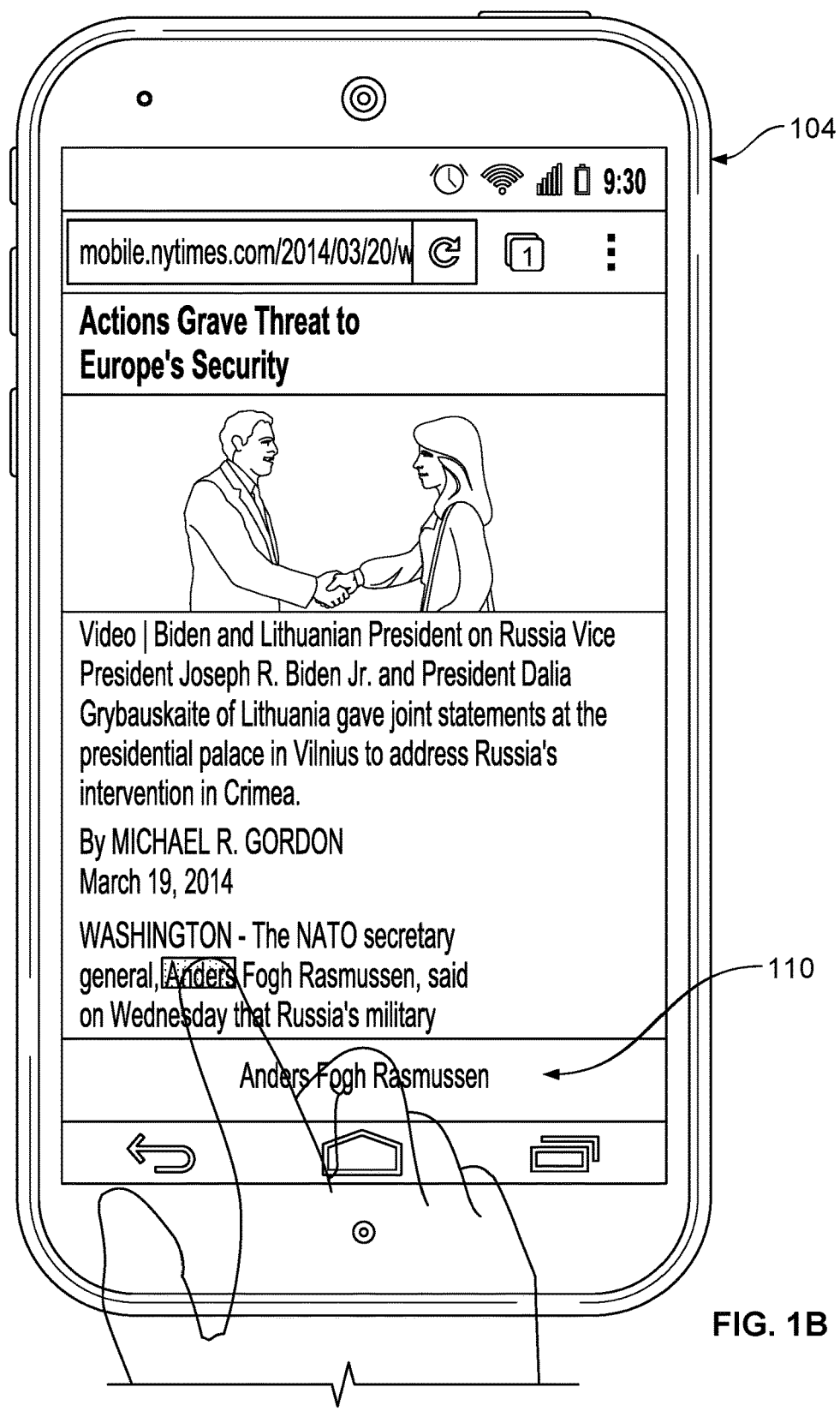
FIG. 1B shows an example drag-up bar displayed on the example mobile device.

FIG. 1B shows an example drag-up bar 110 displayed on the example mobile device 104. The drag-up bar 110 is a user interface element that displays the name of an entity "Anders Fogh Rasmussen" that is referred to by the word selected by the user of the mobile device 104. In order to identify the entity referred to by the input, the mobile device 104 has provided word selection data and context data to a search system. The word selection data identifies the word selected by the user, i.e., "Anders," and the context data includes other words from the document 102. For example, the context data can include each word within a threshold number of words of the selected word in the document. The context data can also include other words or terms associated with the document, e.g., the title of the document, headings in the document, captions of images in the document, or anchor text of in-links to the document. In response, the search system has provided to the mobile device 104 data identifying the entity referred to by the selected word in the context of the other words in the document, and the mobile device 104 has used the data received from the search system to display the name of the entity in the drag-up bar 110.

Figure 1C:
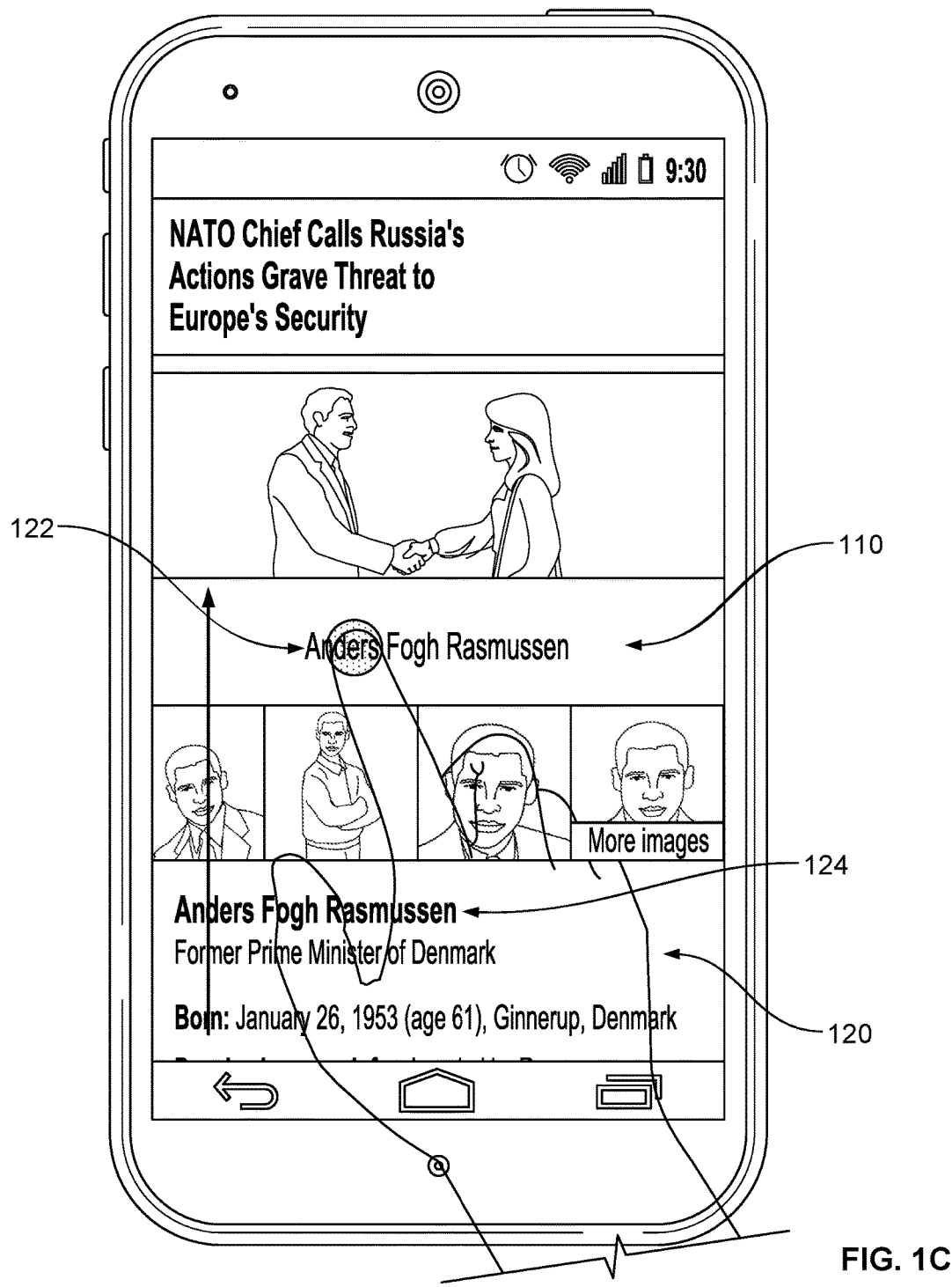
FIG. 1C shows a portion of an example contextual search presentation displayed on the example mobile device.

FIG. 1C shows a portion 120 of an example contextual search presentation displayed on the example mobile device 104. In the example of FIG. 1C, the user of the mobile device 104 has submitted a touch input 122 selecting and dragging the drag-up bar 110. In response, the mobile device 104 has moved the drag-up bar 110 to the corresponding position to display the portion 120 of the contextual search presentation. The contextual search presentation is a presentation that is generated by the search system for the selected word using the word selection data and the context data received from the mobile device 104. In some cases, the mobile device 104 has obtained the contextual search presentation from the search system before the user submitted the input 122, e.g., along with the data identifying the entity referred to by the selected word. In other cases, the mobile device 104 has obtained the contextual search presentation from the search system in response to the user input selecting the drag-up bar.

In the example of FIG. 1C, the contextual search presentation is an entity contextual search presentation that includes a knowledge panel 124 for the entity "Anders Fogh Rasmussen." A knowledge panel is a user interface element generated by a search engine that includes a formatted presentation of content about an entity referred to by a received search query. The content includes textual representations of values of attributes associated with the entity and, optionally, other content relevant to the entity, e.g., images of the entity. The relevant content can vary depending on the type of the entity. For example, a knowledge panel for a monument or other geographic point of interest can include different information than a knowledge panel for a politician or other person of interest. However, as described below, if the word selected by the user does not refer to an entity, a different kind of contextual search presentation can be generated that includes other kinds of formatted content, e.g., various kinds of answer boxes that present formatted content related to the selected word.

Figure 1D:
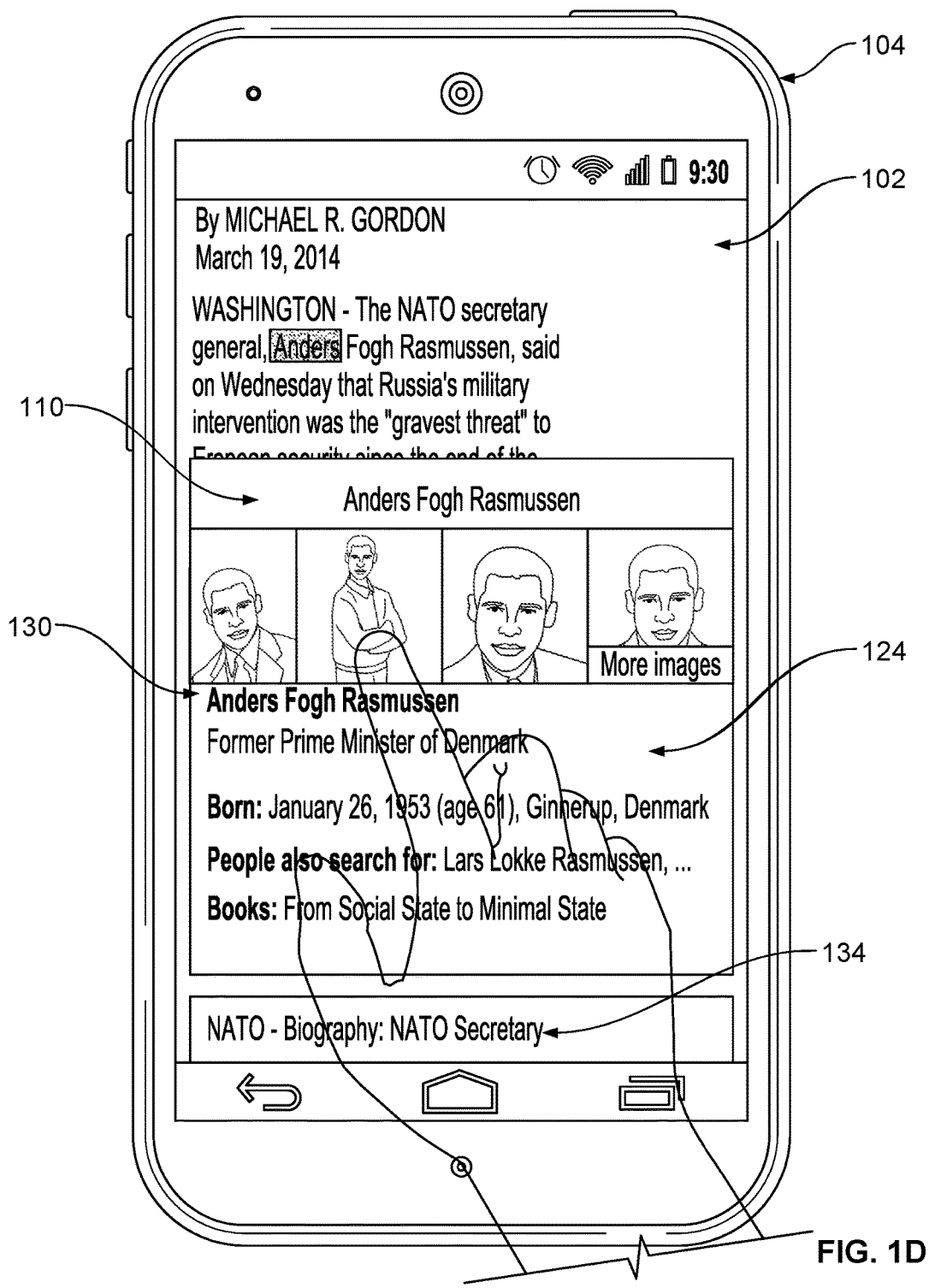
FIG. 1D shows a larger portion of the example contextual search presentation displayed on the example mobile device.

FIG. 1D shows a larger portion 130 of the example contextual search presentation displayed on the example mobile device 104. In some implementations, the mobile device 104 displays the larger portion 130 in response to the user of the mobile device continuing to drag the drag-up bar 110 to a new position. In some other implementations, the mobile device continues to increase the size of the portion 130 after the user has stopped submitting the touch input 122. For example, after the user has stopped submitting the touch input 122, e.g., once the user has released his or her finger from the touch screen display, the mobile device 104 can continue to increase the size of the portion 130 until the portion 130 fills a pre-determined proportion, e.g., fifty percent, sixty percent, or seventy percent, of the display. Optionally, when the size of the portion 130 of contextual search presentation changes, the mobile device 104 can re-center the displayed document 102 so that the word selected by the user remains visible.

The larger portion 130 of the contextual search presentation includes the knowledge panel 124 for the entity "Anders Fogh Rasmussen" and search results 134. The search results 134 are search results generated by a search engine in response to a search query identifying the entity referred to by the selected word. The user of the mobile device 104 can view additional search results by submitting an additional touch input to scroll down on the contextual search presentation or can return to viewing the document 102 by submitting a touch input pulling down on the drag-up bar 110.

Figure 2:
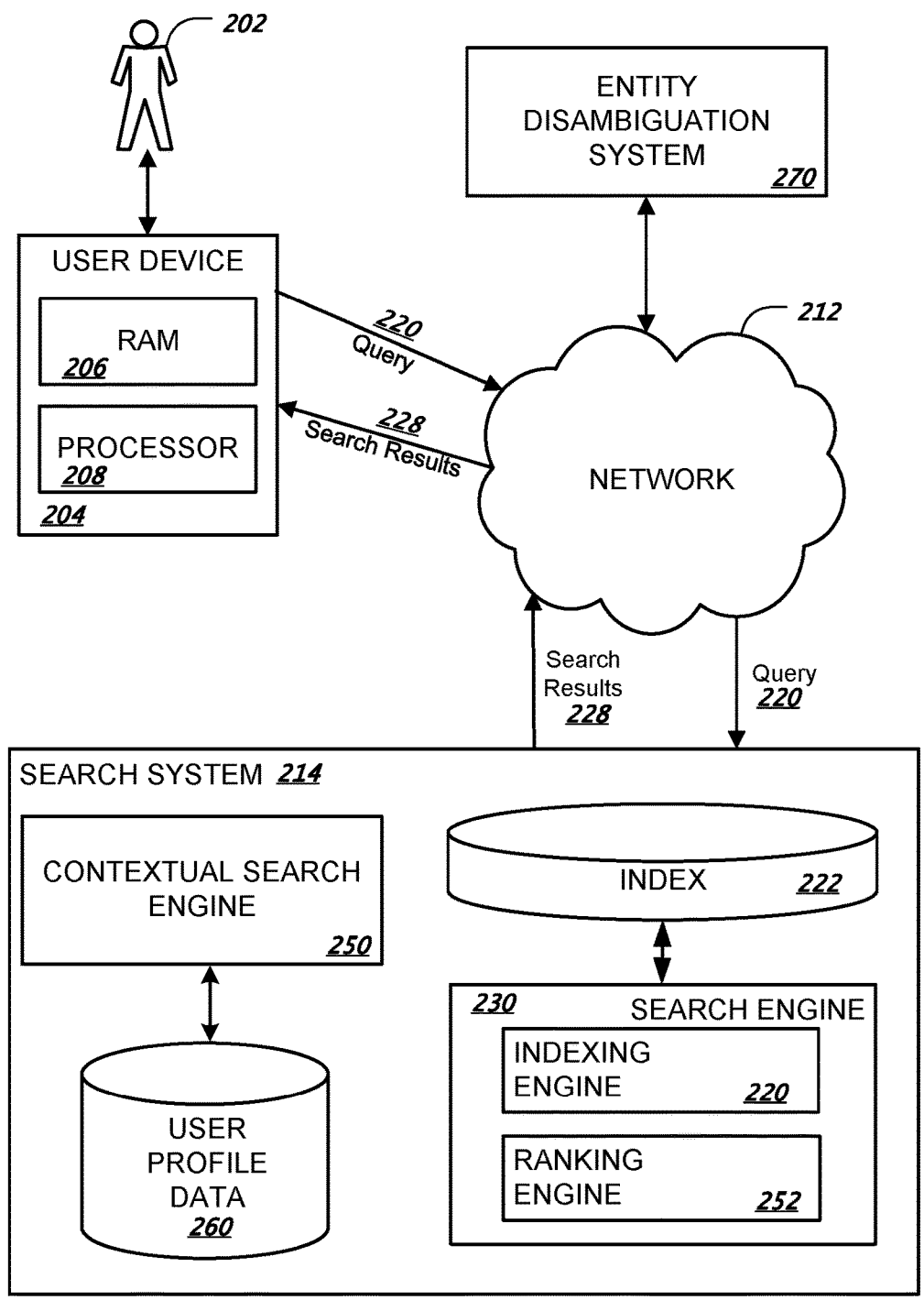
FIG. 2 shows an example search system.

FIG. 2 shows an example search system 214. The search system 214 is an example of an information retrieval system implemented as computer programs on one or more computers in one or more locations, in which the systems, components, and techniques described below are implemented.

A user 202 can interact with the search system 214 through a user device 204. The user device 204 will generally include a memory, e.g., a random access memory (RAM) 206, for storing instructions and data and a processor 208 for executing stored instructions. The memory can include both read only and writable memory. For example, the user device 204 can be a computer, e.g., a smartphone, coupled to the search system 214 through a data communication network 212, e.g., local area network (LAN) or wide area network (WAN), e.g., the Internet, or a combination of networks, any of which may include wireless links.

In some implementations, the search system 214 provides a user interface to the user device 204 through which the user 202 can interact with the search system 214. For example, the search system 214 can provide a user interface in the form of web pages that are rendered by a web browser running on the user device 204, in an app installed on the user device 204, e.g., on a mobile device, or otherwise.

A user 202 can use the user device 204 to submit a query 210 to a search system 214. A search engine 230 within the search system 214 performs a search to identify resources matching the query. When the user 202 submits a query 210, the query 210 may be transmitted through the network 212 to the search system 224. The search system 214 includes an index 222 and the search engine 230. The search system 214 responds to the search query 210 by generating search results 218, which are transmitted through the network 212 to the user device 204 for presentation to the user 202, e.g., as a search results web page to be displayed by a web browser running on the user device 204.

When the query 210 is received by the search engine 230, the search engine 230 identifies resources that satisfy the query 210. The search engine 230 will generally include an indexing engine 220 that indexes resources, an index 222 that stores the index information, and a ranking engine 252 or other software that generates scores for the resources that satisfy the query 210 and that ranks the resources according to their respective scores.

Registered users of the search system 214 may provide data to the search system that is stored in a user profile data repository 260. That is, the user 202 may log in to a user account with the search system 214, e.g., through a web browser executing on the user device 204, and provide data identifying values of particular user attributes, e.g., the user's birthday, the user's city of residence, places the user has vacationed, and so on, that are stored in the user profile data repository 260.

The search system 214 includes or can communicate with a contextual search engine 250. The contextual search engine 250 receives word selection data and context data from user devices and, in response, generates an appropriate contextual search presentation for the selected word identified by the word selection data. The contextual search presentation includes a formatted presentation of content that is relevant to the selected word. Optionally, the contextual search presentation can also include search results obtained from the search engine 230.

In order to select an appropriate contextual search presentation for a given selected word, the contextual search engine 250 can communicate with an entity disambiguation system 270.

The entity disambiguation system 270 receives data identifying a word from a document and context data for the word, i.e., data identifying other words in the same document as the identified word, and classifies the word as either not referring to any entity or referring to a particular entity. Example entities include people, places, countries, landmarks, animals, historical events, organizations, businesses, sports teams, sporting events, movies, songs, albums, games, works of art, fictional characters, and so on. For example, the entity disambiguation system 270 may be a system that analyzes documents or portions of documents and determines which words in the document refer to entities identified in a database that stores information about entities, e.g., a database of structured data that includes nodes that represent entities and identifies the type of each entity represented by a node. An example of an online database of structured data that exists is the Freebase database that is accessible on the Internet at http://www.freebase.com.

In some cases, the contextual search engine 250 may receive an identifier for a user account as part of the context data for a selected word and may use user profile data for the user account that is stored in the user profile data repository 260 in selecting an appropriate contextual search presentation. Optionally, if the contextual search engine 250 receives context data that does not include an identifier or if no profile data or limited profile data is stored in the user profile data repository 260 for the user account identified by a received identifier, the contextual search engine 250 may computationally infer user attribute values for the user from attribute values of the user device from which the search query is received. The contextual search engine 250 may then use the inferred user attribute values in place of user profile data in selecting the appropriate contextual search presentation.

Selecting and generating a contextual search presentation using received word selection data and context data is described in more detail below with reference to FIGS. 3 and 4.

Once the contextual search engine 250 has generated a contextual search presentation, the search system 214 transmits the contextual search presentation to the user device from which the word selection data and the context data were received for presentation to the user.

Figure 3:
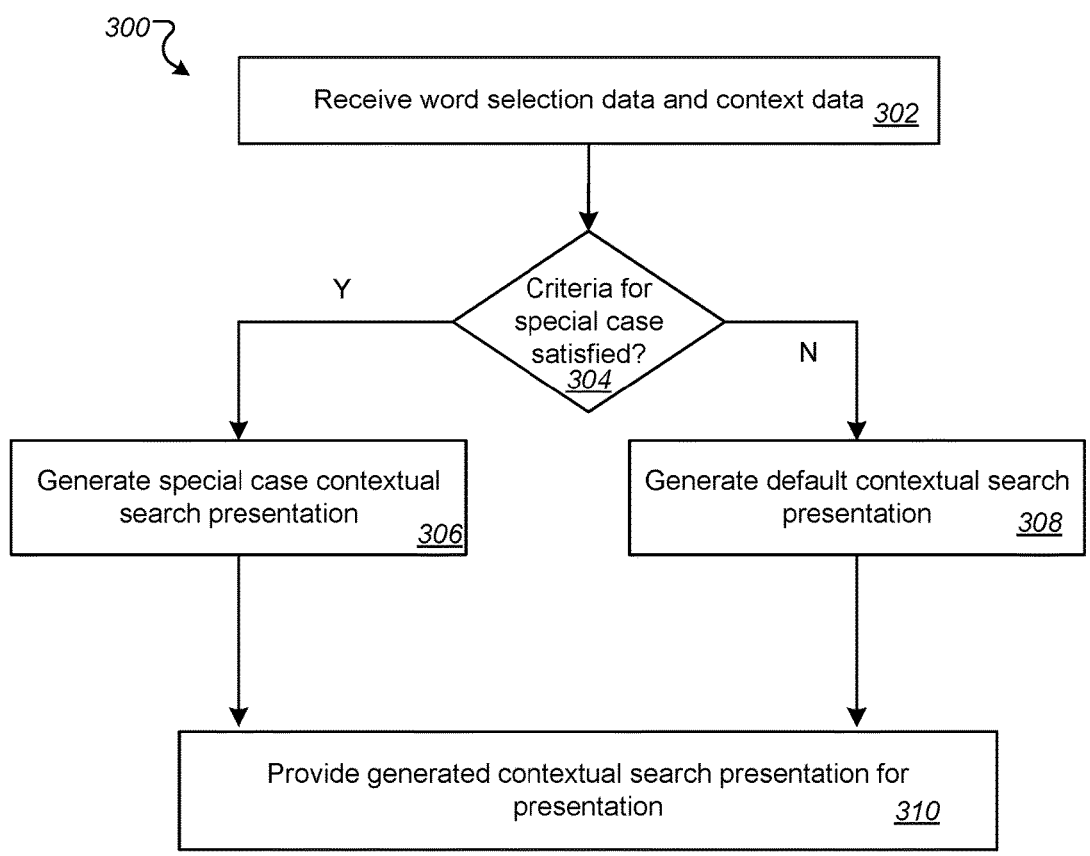
FIG. 3 is a flow diagram of an example process for generating a contextual search presentation for a selected word.

FIG. 3 is a flow diagram of an example process 300 for generating a contextual search presentation for a selected word. For convenience, the process 300 will be described as being performed by a system of one or more computers located in one or more locations. For example, a search system, e.g., the search system 214 of FIG. 2, appropriately programmed in accordance with this specification, can perform the process 300.

The system receives word selection data and context data from a user device (step 302). The word selection data identifies a word selected by a user in a document displayed to the user on the user device. Generally, the context data includes one or more other words in the document displayed to the user. For example, the context data may include each word that is within a threshold number of words of the selected word in the displayed document. However, the context data may also include additional information. For example, the additional information can include user information, e.g., an identifier for a user account with the system that the user is currently logged into on the user device. As another example, the additional information can also include user device information, e.g., location data that identifies the geographic location of the user device, language data that identifies a preferred language setting on the user device, sensor data, e.g., temperature data, and so on.

The system determines, from the word selection data and the context data, whether one or more criteria for presenting any of a set of types of special case contextual search presentations are satisfied (step 304). Determining whether the criteria for presenting a special case contextual presentation are satisfied is described below with reference to FIG. 4.

If the word selection data and the context data satisfy the criteria for presenting one of the types of special case contextual search presentations, the system generates a special case contextual search presentation of the type for the word selected by the user (step 306). Generating a special case contextual search presentation is described below with reference to FIG. 4.

If the word selection data and the context data do not satisfy the criteria for any of the types of special case presentations, the system generates a default contextual search presentation for the word selected by the user (step 308).

In some implementations, the default contextual search presentation is a definitional contextual search presentation. A definitional contextual search presentation is a presentation that includes a definitional answer box for the word selected by the user.

Generally, an answer box is generated by a search engine, e.g., the search engine 230 of FIG. 2, in response to a received search query and includes a formatted presentation of content that is relevant to the received search query. More specifically, a definitional answer box is an answer box generated by the search engine that includes a definition for a word in a received search query.

In order to generate the definitional contextual search presentation, the system requests a definitional answer box for the word selected by the user from the search engine. For example, the system can request the definitional answer box by submitting a search query having a pre-determined syntax to the search engine, e.g., "[word] definition," "define: [word]," or "define [word]," where [word] is the word selected by the user.

The definitional contextual search presentation may also include search results obtained from the search engine. The search results may include one or more of search results obtained in response to the search query derived from the selected word, search results from other result sources, or search results for other interpretations of the search query. In some implementations, the search results may include search results for another search query that is different from the search query submitted to the search engine in order to obtain the definitional answer box.

The system obtains the definitional answer box and, optionally, the search results for the other search query from the search engine and generates a definitional answer box that includes the definitional answer box and, if search results were obtained, the search results.

The system provides the generated contextual search presentation for presentation to the user on the user device (step 310). In some implementations, the system generates and provides the contextual search presentation to the user device without receiving any additional user input after the word selection data and the context data is received. In some other implementations, the system may only generate and provide the contextual search presentation after the user has submitted an additional input, e.g., selecting and dragging a drag-up bar user interface element on the user device, e.g., the drag-up bar 110 of FIGS. 1B-1D.

The above description describes the steps of the process 300 being performed by a system remote from the user device that received the user selection of the word. However, in some implementations, some or all of the steps of the process 300 are performed by the user device. For example, the user device can receive the user input selecting the word, generate the context data for the selected word, and determine whether a special case or default contextual search presentation is to be presented. Once the user device determines the kind of contextual search presentation that is to be presented, the system can provide data identifying the contextual search presentation, the word selection data, and the context data to the remote system for use in generating an appropriate contextual search presentation. As another example, all of the steps of the process 300 can be performed by the user device.

Figure 4:
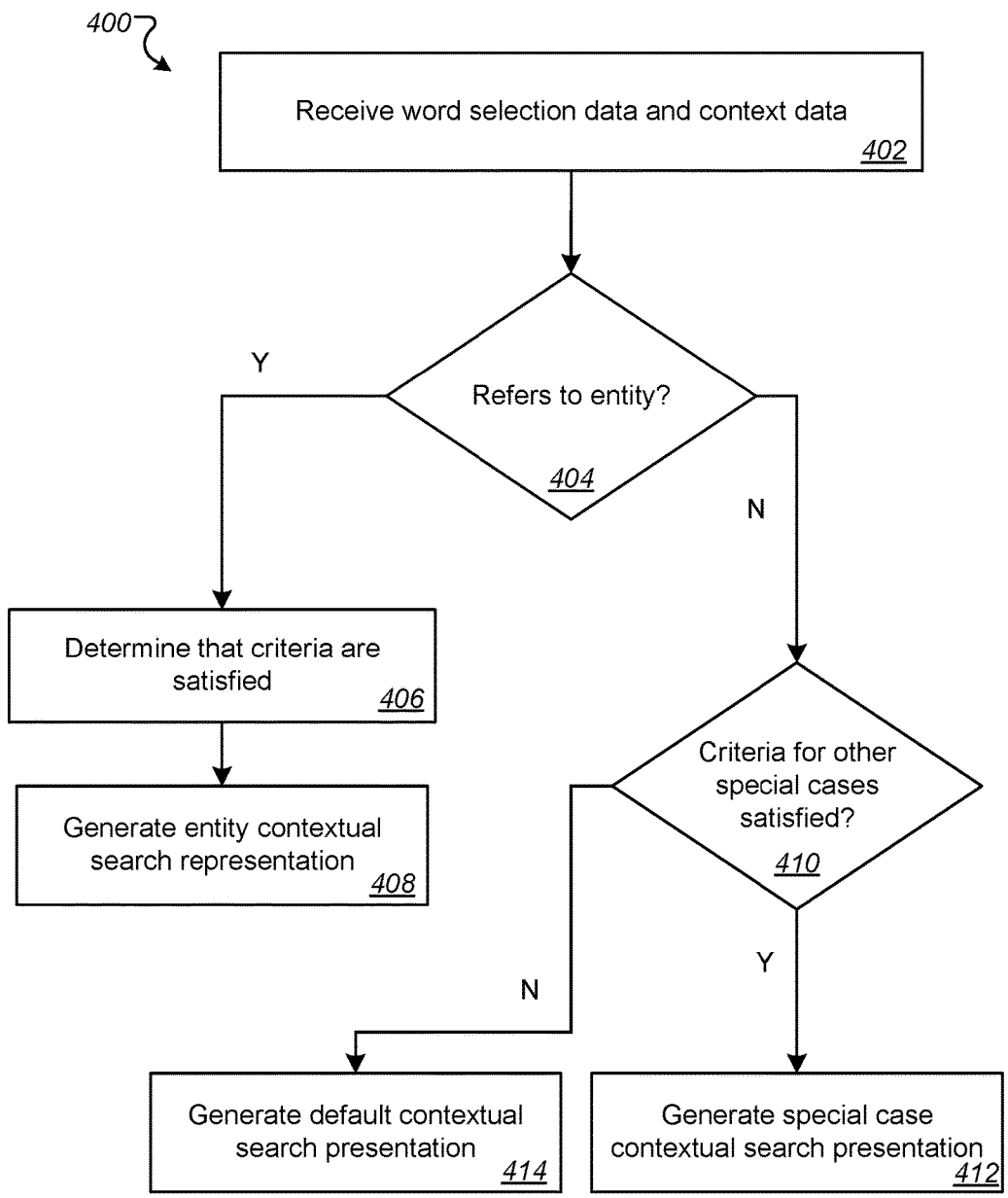
FIG. 4 is a flow diagram of an example process for determining whether criteria for presenting special case contextual search presentations are satisfied and generating special case contextual search presentations.

FIG. 4 is a flow diagram of an example process 400 for determining whether criteria for presenting special case contextual search presentations are satisfied and generating special case contextual search presentations. For convenience, the process 400 will be described as being performed by a system of one or more computers located in one or more locations. For example, a search system, e.g., the search system 214 of FIG. 2, appropriately programmed in accordance with this specification, can perform the process 400.

The system receives word selection data and context data (step 402).

The system determines whether the selected word refers to an entity using the context data (step 404). In order to make this determination, the system provides data identifying the selected word and data identifying the other words in the document to an entity disambiguation system, e.g., the entity disambiguation system 270 of FIG. 2. In response, the system obtains from the entity disambiguation system data indicating whether the selected word refers to an entity in the context of the other words in the document and, if so, the entity referred to by the selected word.

If the selected word refers to an entity, the system determines that the criteria for presenting an entity contextual search presentation are satisfied (step 406) and generates an entity contextual search presentation for the entity referred to by the selected word (step 408). An entity contextual search presentation is a presentation that includes a knowledge card for the entity referred to by the word selected by the user. In order to generate the entity contextual search presentation, the system requests a knowledge card for the word selected by the user from the search engine. For example, the system can request the knowledge card by submitting a search query derived from a name of the entity to the search engine, e.g., a search query that includes the name of the entity and, optionally, one or more terms that disambiguate the entity from other entities having similar names, e.g., "[entity] [type]," where [entity] is the name of the entity and [type] is the type of the entity. For example, if the referred to entity is the basketball player "Michael Jordan," the search query submitted to the search engine may be "Michael Jordan basketball player." If the referred to entity is the actor "Michael Jordan," however, the search query submitted to the search engine may be "Michael Jordan actor."

As another example, the system can request the knowledge card from the search engine by providing to the search engine an identifier for a node that represents the entity in an online database of structured data.

The entity contextual search presentation may optionally also include search results obtained from the search engine in response to the search query derived from the name of the entity referred to by the selected word.

If the selected word does not refer to an entity, the system determines whether the criteria for presenting any other special case contextual search presentations are satisfied (step 410) and, if the criteria for presenting any of the other special cases are satisfied, the system generates a special case contextual search presentation for the selected word (step 412).

For example, the other special case contextual search presentations may include a currency contextual search presentation. A currency contextual search presentation is a contextual search presentation that includes a currency answer box. A currency answer box is an answer box that presents an amount in one currency and a corresponding amount in another currency according to a current exchange rate.

In order to determine whether the criteria for presenting the currency contextual search presentation are satisfied, the system determines whether the word selected by the user identifies a particular currency and, if so, whether the particular currency is different from a currency associated with the user. The system can determine that the word selected by the user identifies the currency when the user has selected a currency name, e.g., "euro," sign, e.g., "€," or code, e.g., "EUR." Optionally, the system can also determine that the word selected by the user identifies a currency when the user has selected a number or a number word and the context data includes a currency name, sign, or code.

The system can determine whether the particular currency is different from the currency associated with the user from the received context data. For example, if the context data includes an identifier for a user account associated with the user, the system can determine, from user profile data for the user account, the country of residence of the user and can determine whether the particular currency is different from the official currency or currencies for the country of residence. As another example, if the context data does not include an identifier for the user account associated with the user, the system can determine, from location data for the user device, the country where the user device is located and can determine whether the particular currency is different from the official currency or currencies for that country. In some implementations, the system determines that the currency associated with the user is the official currency of the country where the user device is located even if data identifying the official currency of the country of residence is available, e.g., to account for users travelling in foreign countries and selecting currency amounts in their home currency wanting to know the corresponding amount in the foreign currency.

If the particular currency is different from the currency associated with the user, the system determines that the criteria for presenting a currency contextual search presentation are satisfied and generates a currency contextual search presentation for the entity referred to by the selected word. In order to generate the currency contextual search presentation, the system requests a currency answer box for the word selected by the user from the search engine that presents an amount in the particular currency and a corresponding amount in the currency associated with the user. For example, the system can request the conversion answer box by submitting a search query having a pre-determined syntax to the search engine, e.g., "[amount] [particular currency] to [currency associated with the user]" or "how much is [amount] [particular currency] in [currency associated with the user]," where [amount] is either a default amount or an amount identified by the word selection or context data, [particular currency] is the particular currency, and [currency associated with the user] is the currency associated with the user.

The currency contextual search presentation may also include search results obtained from the search engine. The search results may include one or more of search results obtained in response to the search query derived from the selected word, search results from other result sources, or search results other interpretations of the search query. In some implementations, the search results include search results obtained for another search query that is different from the search query submitted to the search engine in order to obtain the currency answer box. For example, the search results for the other search query may include results about recent news about changes in the value of the currency or results about the history of the currency.

As another example, the special case contextual search presentations may include a translation contextual search presentation. A translation contextual search presentation is a contextual search presentation that includes a translation answer box. A translation answer box is an answer box that presents a translation of a word from one language to another.

In order to determine whether the criteria for presenting the translation contextual search presentation are satisfied, the system determines the language that the word selected by the user is written in and whether the language of the selected word is different from a language associated with the user, e.g., a language identified in user profile data for the user as a language spoken by the user or an official language for the country of residence of the user.

If the language of the selected word is different from a language associated with the user, the system determines that the criteria for presenting a translation contextual search presentation are satisfied and generates a translation contextual search presentation for the entity referred to by the selected word. In order to generate the translation contextual search presentation, the system requests a translation answer box for the word selected by the user from the search engine that presents a translation of the selected word into the language associated with the user. For example, the system can request the translation answer box by submitting a search query having a pre-determined syntax to the search engine, e.g., "translate [word] into [language associated with the user]" or "translate [word] from [word language] to [language associated with the user]," where [word] is the selected word, [language associated with the user] is the language associated with the user, and [word language] is the language the word is written in.

The translation contextual search presentation may also include search results obtained from the search engine. The search results may include one or more of search results obtained in response to the search query derived from the selected word, search results from other result sources, or search results other interpretations of the search query. In some implementations, the search results include search results obtained for another search query that is different from the search query submitted to the search engine in order to obtain the answer box. For example, the search results for the other search query may include images corresponding to the selected word.

As another example, the special case contextual search presentations may include a time zone contextual search presentation. A time zone contextual search presentation is a contextual search presentation that includes a time zone answer box. A time zone answer box is an answer box that presents a conversion of a time from one time zone to another.

In order to determine whether the criteria for presenting the time zone contextual search presentation are satisfied, the system determines whether the selected word identifies a time in a particular time zone and, if so, whether the particular time zone is different from a time zone associated with the user, e.g., the time zone for the residence of the user identified in user profile data for the user or the time zone of the current location of the user device. The system may determine that the selected word identifies a time in a particular time zone if the selected word identifies a time zone and the context data includes a time, if the selected word identifies a time and the context data identifies a time zone, or both.

If the particular time zone is different from a time zone associated with the user, the system determines that the criteria for presenting a time zone contextual search presentation are satisfied and generates a time zone contextual search presentation for the entity referred to by the selected word. In order to generate the time zone contextual search presentation, the system requests a time zone answer box for the word selected by the user from the search engine that includes presents the time from the particular time zone that corresponds to the time zone associated with the user. For example, the system can request the time zone answer box by submitting a search query having a pre-determined syntax to the search engine, e.g., "convert [time] [particular time zone] to [time zone associated with the user]" or "what time is [time] [particular time zone] in [time zone associated with the user]," where [time] is the time, [particular time zone] is the particular time zone, and [time zone associated with the user] is the time zone associated with the user.

The time zone contextual search presentation may also include search results obtained from the search engine. The search results may include one or more of search results obtained in response to the search query derived from the selected word, search results from other result sources, or search results other interpretations of the search query. In some implementations, the search results include search results obtained for another search query that is different from the search query submitted to the search engine in order to obtain the currency answer box. For example, the search results for the other search query may include search results about maps of the time zone.

The above description describes certain special case contextual search presentations. However, other special case contextual search presentations may be presented when other criteria are satisfied. For example, other special case contextual presentations may include various kinds of unit conversion answer boxes that present conversion of measurements in one unit to measurements in other units.

The above description describes receiving word selection data that identifies a word selected by a user from a document displayed be the user. However, in some implementations, the selection data can identify different portions of the document that have been selected by the user, e.g., a term, i.e., one or more adjacent words, from the document. In these implementations, the system can receive and process the selection data in the same manner as described above for the word selection data.

In situations in which the systems described here collect personal information about users, or may make use of personal information, the users may be provided with an opportunity to control whether programs or features collect user information, e.g., user profile data and user device data, or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, such as to a city, postal code, or state level, so that a particular location of a user cannot be determined. Thus, the user may have control over how information is collected about the user and used by the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a first selection data identifying one or more words selected by a user from a document displayed to the user in a user interface of a user device;
obtaining context data comprising one or more words in the document other than the one or more words of the first selection data;
providing the first selection data and the context data to an entity disambiguation system that is configured to determine, based on the first selection data and the context data, whether the selection data identifies an entity;
receiving data indicating that the first selection data identifies an entity from the entity disambiguation system;
in response to receiving data from the entity disambiguation system indicating that the first selection data identifies an entity:
obtaining an entity-type special contextual search presentation that is formatted specifically to display content relevant to an entity for the first selection data from among a plurality of contextual search presentations that includes (i) the entity-type special contextual search presentation and (ii) one or more contextual search presentations that are formatted differently from the entity-type special contextual search presentation; and
providing the entity-type special contextual search presentation for display in the user interface of the user device.

2. The method of claim 1, further comprising:
obtaining a second selection data identifying one or more words selected by the user from a document displayed to the user in the user interface of the user device;
obtaining context data comprising one or more words in the document other than the one or more words of the second selection data;
providing the second selection data and the context data to the entity disambiguation system that is configured to determine, based on the second selection data and the context data, whether the second selection data identifies an entity;
receiving data indicating that the second selection data does not identify an entity from the entity disambiguation system;
in response to receiving data indicating that the second selection data does not identify an entity:
determining that the second selection data and the context data satisfy one or more criteria for presenting a different type of special contextual search presentation for the second selection data that is formatted differently from the entity-type special contextual search presentation;
in response to determining that the second selection data and the context data satisfy one or more criteria for presenting the different type of special contextual search presentation for the second selection data:
obtaining the different type of special contextual search presentation; and
providing the different type of special contextual search presentation for display in the user interface of the user device.

3. The method of claim 1, further comprising:
obtaining a third selection data identifying one or more words selected by the user from a document displayed to the user in the user interface of the user device;
obtaining context data comprising one or more words in the document other than the one or more words of the third selection data;
providing the third selection data and the context data to the entity disambiguation system that is configured to determine, based on the third selection data and the context data, whether the third selection data identifies an entity;
receiving data indicating that the third selection data does not identify an entity from the entity disambiguation system;
in response to receiving data indicating that the third selection data does not identify an entity:
determining that the third selection data and the context data do not satisfy one or more criteria for presenting a different type of special contextual search presentation for the third selection data that is formatted differently from the entity-type special contextual search presentation;
in response to determining that the third selection data and the context data does not satisfy one or more criteria for presenting the different type of special contextual search presentation for the selection data:
obtaining a default contextual search presentation that is formatted differently from the entity-type special contextual search presentation; and
providing the default contextual search presentation for display in the user interface of the user device.

4. The method of claim 1, wherein obtaining an entity-type special contextual search presentation for the selection data includes obtaining a knowledge panel for the entity identified by the first selection data.

5. The method of claim 1, wherein providing the entity-type special contextual search presentation for display in the user interface includes providing the entity-type special contextual search presentation for display in the user interface without receiving any additional input from the user after the first selection data is selected by the user.

6. The method of claim 1, wherein providing the entity-type special contextual search presentation for display in the user interface includes providing the entity-type special contextual search presentation for display in the user interface only after receiving additional input from the user after the first selection data is selected by the user.

7. The method of claim 6, wherein the additional input from the user after the first selection data is selected by the user includes (i) selecting the entity-type special contextual search presentation, (ii) dragging the entity-type special contextual search presentation, (iii) or both.

8. A system, comprising:
one or more computers and one or more storage devices storing instructions that are operable, when executed by the one or more computers, to cause the one or more computers to perform operations comprising:
obtaining a first selection data identifying one or more words selected by a user from a document displayed to the user in a user interface of a user device;
obtaining context data comprising one or more words in the document other than the one or more words of the first selection data;
providing the first selection data and the context data to an entity disambiguation system that is configured to determine, based on the first selection data and the context data, whether the selection data identifies an entity;

receiving data indicating that the first selection data identifies an entity from the entity disambiguation system;

in response to receiving data from the entity disambiguation system indicating that the first selection data identifies an entity:

obtaining an entity-type special contextual search presentation that is formatted specifically to display content relevant to an entity for the first selection data from among a plurality of contextual search presentations that includes (i) the entity-type special contextual search presentation and (ii) one or more contextual search presentations that are formatted differently from the entity-type special contextual search presentation; and providing the entity-type special contextual search presentation for display in the user interface of the user device.

9. The system of claim 8, the operations further comprising:

obtaining a second selection data identifying one or more words selected by the user from a document displayed to the user in the user interface of the user device;

obtaining context data comprising one or more words in the document other than the one or more words of the second selection data;

providing the second selection data and the context data to the entity disambiguation system that is configured to determine, based on the second selection data and the context data, whether the second selection data identifies an entity;

receiving data indicating that the second selection data does not identify an entity from the entity disambiguation system;

in response to receiving data indicating that the second selection data does not identify an entity:

determining that the second selection data and the context data satisfy one or more criteria for presenting a different type of special contextual search presentation for the second selection data that is formatted differently from the entity-type special contextual search presentation;

in response to determining that the second selection data and the context data satisfy one or more criteria for presenting the different type of special contextual search presentation for the selection data:

obtaining the different type of special contextual search presentation; and providing the different type of special contextual search presentation for display in the user interface of the user device.

10. The system of claim 8, the operations further comprising:

obtaining a third selection data identifying one or more words selected by the user from a document displayed to the user in the user interface of the user device;

obtaining context data comprising one or more words in the document other than the one or more words of the third selection data;

providing the third selection data and the context data to the entity disambiguation system that is configured to determine, based on the third selection data and the context data, whether the third selection data identifies an entity;

receiving data indicating that the third selection data does not identify an entity from the entity disambiguation system;

in response to receiving data indicating that the third selection data does not identify an entity:

determining that the third selection data and the context data do not satisfy one or more criteria for presenting a different type of special contextual search presentation for the third selection data that is formatted differently from the entity-type special contextual search presentation;

in response to determining that the third selection data and the context data does not satisfy one or more criteria for presenting the different type of special contextual search presentation for the third selection data:

obtaining a default contextual search presentation that is formatted differently from the entity-type special contextual search presentation; and providing the default contextual search presentation for display in the user interface of the user device.

11. The system of claim 8, wherein obtaining an entity-type special contextual search presentation for the selection data includes obtaining a knowledge panel for the entity identified by the first selection data.

12. The system of claim 8, wherein providing the entity-type special contextual search presentation for display in the user interface includes providing the entity-type special contextual search presentation for display in the user interface without receiving any additional input from the user after the first selection data is selected by the user.

13. The system of claim 8, wherein providing the entity-type special contextual search presentation for display in the user interface includes providing the entity-type special contextual search presentation for display in the user interface only after receiving additional input from the user after the first selection data is selected by the user.

14. A non-transitory computer-readable medium storing software comprising instructions executable by one or more computers which, upon such execution, cause the one or more computers to perform operations comprising:

obtaining a first selection data identifying one or more words selected by a user from a document displayed to the user in a user interface of a user device;

obtaining context data comprising one or more words in the document other than the one or more words of the first selection data;

providing the first selection data and the context data to an entity disambiguation system that is configured to determine, based on the first selection data and the context data, whether the first selection data identifies an entity;

receiving data indicating that the first selection data identifies an entity from the entity disambiguation system;

in response to receiving data from the entity disambiguation system indicating that the first selection data identifies an entity:

obtaining an entity-type special contextual search presentation that is formatted specifically to display content relevant to an entity for the first selection data from among a plurality of contextual search presentations that includes (i) the entity-type special contextual search presentation and (ii) one or more contextual search presentations that are formatted differently from the entity-type special contextual search presentation; and providing the entity-type special contextual search presentation for display in the user interface of the user device.

15. The computer-readable medium of claim 14, the operations further comprising:
   obtaining a second selection data identifying one or more words selected by the user from a document displayed to the user in the user interface of the user device;
   obtaining context data comprising one or more words in the document other than the one or more words of the second selection data;
   providing the second selection data and the context data to the entity disambiguation system that is configured to determine, based on the second selection data and the context data, whether the second selection data identifies an entity;
   receiving data indicating that the second selection data does not identify an entity from the entity disambiguation system;
   in response to receiving data indicating that the second selection data does not identify an entity:
      determining that the second selection data and the context data satisfy one or more criteria for presenting a different type of special contextual search presentation for the second selection data that is formatted differently from the entity-type special contextual search presentation;
      in response to determining that the second selection data and the context data satisfy one or more criteria for presenting the different type of special contextual search presentation for the second selection data:
         obtaining the different type of special contextual search presentation; and
         providing the different type of special contextual search presentation for display in the user interface of the user device.

16. The computer-readable medium of claim 14, the operations further comprising:
   obtaining a third selection data identifying one or more words selected by the user from a document displayed to the user in the user interface of the user device;
   obtaining context data comprising one or more words in the document other than the one or more words of the third selection data;
   providing the third selection data and the context data to the entity disambiguation system that is configured to determine, based on the third selection data and the context data, whether the third selection data identifies an entity;
   receiving data indicating that the third selection data does not identify an entity from the entity disambiguation system;
   in response to receiving data indicating that the third selection data does not identify an entity:
      determining that the third selection data and the context data does not satisfy one or more criteria for presenting a different type of special contextual search presentation for the third selection data that is formatted differently from the entity-type special contextual search presentation;
      in response to determining that the third selection data and the context data does not satisfy one or more criteria for presenting the different type of special contextual search presentation for the third selection data:
         obtaining a default contextual search presentation that is formatted differently from the entity-type special contextual search presentation; and
         providing the default contextual search presentation for display in the user interface of the user device.

17. The computer-readable medium of claim 14, wherein obtaining an entity-type special contextual search presentation for the first selection data includes obtaining a knowledge panel for the entity identified by the selection data.

18. The computer-readable medium of claim 14, wherein providing the entity-type special contextual search presentation for display in the user interface includes providing the entity-type special contextual search presentation for display in the user interface without receiving any additional input from the user after the first selection data is selected by the user.

19. The computer-readable medium of claim 14, wherein providing the entity-type special contextual search presentation for display in the user interface includes providing the entity-type special contextual search presentation for display in the user interface only after receiving additional input from the user after the first selection data is selected by the user.

20. The computer-readable medium of claim 19, wherein the additional input from the user after the first selection data is selected by the user includes (i) selecting the entity-type special contextual search presentation, (ii) dragging the entity-type special contextual search presentation, (iii) or both.

* * * * *

UNITED STATES PATENT AND TRADEMARK OFFICE
CERTIFICATE OF CORRECTION

PATENT NO. : 10,394,841 B2
APPLICATION NO. : 15/454117
DATED : August 27, 2019
INVENTOR(S) : Denman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this
Second Day of June, 2020

Andrei Iancu
*Director of the United States Patent and Trademark Office*